United States Patent [19]

Lindsay et al.

[11] 3,862,219

[45] Jan. 21, 1975

[54] PROCESS FOR THE PREPARATION OF ALKALI-METAL SALTS OF CARBOXYALKOXY SUCCINATES

[75] Inventors: Kenneth L. Lindsay; Paul Kobetz, both of Baton Rouge, La.

[73] Assignee: Ethyl Corporation, New York, N.Y.

[22] Filed: Oct. 20, 1971

[21] Appl. No.: 191,124

[52] U.S. Cl. ............................................ 260/535 P
[51] Int. Cl. ............................................ C07c 59/22
[58] Field of Search ................... 260/535 P; 212/89

[56] References Cited
UNITED STATES PATENTS
3,692,685    9/1972    Lambert et al. ..................... 252/89

Primary Examiner—Lorraine A. Weinberger
Assistant Examiner—Paul J. Killos
Attorney, Agent, or Firm—Donald L. Johnson; John F. Sieberth; Shelton B. McAnelly

[57] ABSTRACT

It is disclosed that high purity alkali metal salts of carboxyalkoxy succinic acid are produced from maleic acid and a hydroxy organic acid by reaction of zinc or alkaline earth metal salts of said acids to form a zinc or alkaline earth metal carboxyalkoxy succinate, by reacting the zinc or alkaline earth metal carboxyalkoxy succinate with an alkali metal carbonate in a stoichiometric deficiency of carbonate to selectively react with the alkaline earth metal carboxyalkoxy succinate, leaving the impurities as insoluble alkaline earth metal salts, removing the zinc or alkaline earth metal as insoluble carbonate, and recovering an alkali metal carboxyalkoxy succinate solution which is then evaporated to dryness.

10 Claims, No Drawings

PROCESS FOR THE PREPARATION OF ALKALI-METAL SALTS OF CARBOXYALKOXY SUCCINATES

BACKGROUND OF THE INVENTION

1. Field of the Invention

This invention relates to the preparation of alkali metal carboxyalkoxy succinates and in particular to the preparation of said succinates in hydrated form.

2. Description of the Prior Art

It is known that alkali metal carboxyalkoxy succinates are useful detergent components, particularly as builders in detergent formulations.

Generally, the salts useful as builders are alkali metal salts of acids which have the formula:

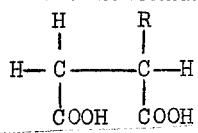

wherein R is a carboxyalkoxy radical (—OR'COOH) having from two to about seven carbon atoms total, R' being a "divalent alkyl" structure ($-(CH_2)_n-$) where $n$ is 1–6. Examples of such acids are α-carboxymethoxy succinic acid where R' is methyl and $n$ is 1, α-(1-carboxybutoxy) succinic acid where R' is butyl and $n$ is 4, α-(2-methyl-3-carboxybutoxy) succinic acid, α-(1-carboxyhexoxy) succinic acid, α-carboxyisobutoxy succinic acid, and the like. A preferred acid has been found to be the above mentioned α-carboxymethoxy succinic acid.

The water soluble salts of a α-carboxyalkoxy succinic acid are very useful detergent builders. The preferred salts are the mono-, di- and trialkali metal salts of such acids due to their relative inexpensiveness and stability. Examples of such salts are α-carboxymethoxy succinic acid, monosodium salt; α-carboxymethoxy succinic acid, trisodium salt; α-(1-carboxyethoxy) succinic acid; tripotassium salt; α-carboxyisobutoxy succinic acid, dilithium salt; α-carboxymethoxy succinic acid, monocesium salt; α-(1-carboxypropoxy) succinic acid, dirubidium salt; α-carboxymethoxy succinic acid, tripotassium salt and the like. Normally, the sodium or potassium salts will be found most useful. However, other non-alkali metal salts may be found suitable such as the ammonium salts, alkylammonium salts, or the like.

The builders of this invention can be advantageously used with a wide variety of detergent actives or surfactants, including those known in the art as anionic, cationic, nonionic, ampholytic, and zwitterionic detergents as well as any suitable mixture of such detergents. When the resultant washing compositions are used in aqueous washing systems, the cleaning power of the formulation is enhanced in much the same way as when the commonly used polyphosphate builders are employed. Yet the present builder systems do not contribute to the eutrophication problems characteristic or phosphorus-containing builders.

It has been known that the carboxyalkoxy succinates are produced by reacting zinc or alkaline earth metal salts of maleic acid and an appropriate hydroxy organic acid. For example, salts of glycolic acid and maleic acid may be reacted in an aqueous medium, usually with enough zinc or alkaline earth metal hydroxide such as calcium hydroxide to produce a pH of at least about 8 and preferably higher than about 11 as measured initially at 25°C to produce α-carboxymethoxy succinic acid, calcium salt. When such a typical mixture is heated to reflux temperature and maintained at that temperature for about 2 hours a carboxymethoxy succinate salt of zinc or alkaline earth metal is produced. In the past, a typical calcium system as obtained at this point has been reacted with sodium carbonate at a moderate temperature of about 60°C, for example, then cooled to room temperature following which suspended calcium carbonate is filtered off and the filtrate is evaporated to recover a particulate alkali metal carboxymethoxy succinate. Unfortunately, the product recovered at this point has the undesired characteristics of being hygroscopic and of having a low purity.

Accordingly, it is an object of the present invention to provide a method of providing a pure alkali metal carboxymethoxy succinate of high purity and which is not hygroscopic.

Another object of the present invention is to provide a process for minimizing the content of contaminant salts of maleic acid, furmaric acid or hydroxy organic acid in alkali metal carboxyalkoxy succinate.

SUMMARY OF THE INVENTION

The present invention relates to a process for producing a high purity alkali metal carboxyalkoxy succinate from a zinc or alkaline earth metal carboxyalkoxy succinate contaminated with salt of at least one of maleic acid, fumaric acid and hydroxy organic acid. The contaminated salt, optionally with a preliminary water wash at a temperature from about 50° to about 100°C to remove some of the contaminants beforehand, is selectively reacted with alkali metal carbonate in a stoichiometric deficiency ratio of alkali metal carbonate for complete reaction of all zinc or alkaline earth metal salt present to form a solution of an alkali metal carboxyalkoxy succinate containing a precipitate or suspension of a carbonate of the zinc or alkaline earth metal component of the zinc or alkaline earth metal carboxyalkoxy succinate. The alkali metal carboxyalkoxy succinate solution is then recovered from the zinc or alkaline earth metal carbonate by a suitable separation process such as filtering, decanting, centrifuging, and the like to produce a solution which is then evaporated to dryness to recover a particulate alkali metal carboxyalkoxy succinate of improved purity.

Preferably, the process uses an alkaline earth metal carboxymethoxy succinate that is contaminated with alkaline earth metal salt of at least one maleic acid, fumaric acid and glycolic acid.

Typically, such a mixture is obtained by reacting alkaline earth metal glycolate and alkaline earth metal maleate in an alkaline earth metal hydroxide system at a pH of greater than about 8 producing an insoluble salt system which is recovered from the mother liquor by a suitable recovery operation such as decantation, filtration or centrifuging. This produces an impure zinc or alkaline earth metal salt containing undesirably large quantities of salts of maleic acid, fumaric acid or glycolic acid.

The salt mixture thus obtained preferably is washed with water as a preliminary treatment to remove some of the impurity salt. This is usually at a temperature from about 25° to about 125°C, preferably at from about 50° to about 100°C in which range the contaminant salts, although still poorly soluble, have a higher solubility in water than the zinc or alkaline earth metal carboxymethoxy succinate producing a differential separation of the impurity salts when the extractant water is separated from the substantially insoluble zinc or alkaline earth metal carboxymethoxy succinate. Preferably, the decantation, filtration or centrifuging operation is likewise conducted at a temperature in the region of from about 50° to about 100°C to minimize redeposition of the impurity salts on the one hand and to minimize excessive losses of the zinc or alkaline earth metal carboxymethoxy succinic acid salts at the higher temperatures.

The recovered zinc or alkaline earth metal carboxymethoxy succinate which is only slightly soluble in water at ordinary temperatures of from about 25° to about 100°C is reacted with an alkali metal carbonate, preferably sodium carbonate or potassium carbonate. Thus is formed a solution of alkali metal carboxymethoxy succinate such as carboxymethoxy succinic acid, trisodium salt and carboxymethoxy succinic acid, tripotassium salt.

The zinc or alkaline earth metal carboxyalkoxy succinates appear to have a higher reactivity with the alkali metal carbonate than the zinc or alkaline earth metal maleates, fumarates, or hydroxy organic acid salts such as the glycolates. The result of this is that when there is a deficiency of alkali metal carbonate to react with all of the zinc or alkaline earth metal salts present that the zinc or alkaline earth metal carboxyalkoxy succinates react preferentially forming soluble alkali metal salts, leaving unreacted or redistributed zinc or alkaline earth metal maleates, fumarates, glycolates, etc., which are, for the most part, insoluble precipitates removable by filtration yielding a purified solution of alkali metal carboxyalkoxy succinate.

In general, one prefers to convert as large a percentage of the zinc or alkaline earth metal carboxyalkoxy succinate as is possible to minimize the amount that must be recycled. Thus, practical ranges for the amount of alkali metal carbonate used relative to the zinc or alkaline earth metal carboxyalkoxy succinate range from about 25 percent of the stoichiometric amount up to about 100 percent of the stoichiometric amount for the zinc or alkaline earth metal carboxyalkoxy succinate content of the impure material fed to the reaction. When less than about 25 percent of stoichiometric alkali metal carbonate is used, the amount of recycle required to ultimately recover all of the desired product becomes excessive whereas when more than 100 percent of the stoichiometric amount of alkali metal carbonate is used it is not possible to obtain the desired selectivity of reaction. In general, one prefers to use a narrower ratio range of from about 50 to about 90 percent of the stoichiometric amount with an even narrower range of from about 60 to about 80 percent of the stoichiometric amount generally more preferred where maximum selectivity and minimum amount of recycle are desired.

An added feature of the alkali metal carbonate reaction is that it provides a convenient and effective way to remove the zinc and/or alkaline earth metal constituency of the carboxyalkoxy succinate fed to the reaction since the zinc and the alkaline earth metal carbonates that form are very insoluble permitting a convenient and effective filtration separation of the soluble alkali metal carboxyalkoxy succinate solution leaving zinc or alkaline earth metal carbonate as well as unreacted zinc or alkaline earth metal carboxyalkoxy succinate and the poorly soluble zinc or alkaline earth metal maleates, fumarates, glycolates, etc.

Other conventional separation techniques such as decantation and centrifuging are also suitably used at this point. Preferred temperatures for the carbonate reaction are from about 70° to about 100°C which provide the incidental benefit that they facilitate the break-up of calcium chelates that can exist in certain situations.

The alkali metal carbonate reactant may be fed as such, e.g., sodium carbonate, potassium carbonate. Alternately, it may be supplied by feeding a bicarbonate such as sodium bicarbonate. The bicarbonate is usually not desirable because it has a lower alkali metal/carbonate ratio; however, in those instances where it is desired to provide increased carbonate it may be desirable to feed a bicarbonate or a mixture of carbonate and bicarbonate.

Preferably, the zinc or alkaline earth metal carboxyalkoxy succinates used in the present process are produced by a reaction of zinc or alkaline earth metal salts of glycolic acid and of maleic acid at a pH of at least about 8 as measured at 25°C, preferably at a pH of from about 10 to about 11.5 likewise measured at 25°C. When such salts are reacted to produce a carboxyalkoxy succinate, the zinc or alkaline earth metal carboxyalkoxy succinate is a carboxymethoxy succinate such as calcium carboxymethoxy succinate. The zinc or alkaline earth metal carboxyalkoxy succinate thus obtained is usually contaminated with residual zinc or alkaline earth metal salts reactants or with by-product salts, typically zinc or alkaline earth metal glycolates, maleates, and fumarates, particularly such salts of calcium.

Thus is recovered an alkali metal carboxyalkoxy succinate solution which ordinarily must be dried to remove excess water. Although it is usually adequate to dry the solution in conventional ways such as evaporation, particularly evaporation under vacuum, spray drying, and the like, it has been found that the nature of the product particularly with regard to hygroscopicity is influenced to a significant degree by the conditions used in the drying. Preferably, a drying operation is conducted which produces directly a salt which is stable with regard to moisture content at ambient conditions of temperature and pressure ordinarily used for the storage, transportation and packaging thereof. Thus the salt product, being stable, would not be prone to either or a loss or gain of moisture. One ordinarily prefers to use drying conditions which produce such a salt and which minimize the formation of salts containing a lesser amount of water of hydration and of occluded water than the ambient-stable amount. Thus, in general it is preferred to minimize the period of prolonged contact of such a hydrate of carboxymethoxy succinic acid, trisodium salt, with temperatures much in excess of about 50°C which produce an excessively dry product that tends to become moist or sticky in picking up moisture from the atmosphere. In general, this creates a preference for drying an alkali metal carboxymethoxy succinate solution at a temperature of from about 25° to about 150°C with the preference being for drying at temperatures below 100°C and in particular at temperatures below about 75°C. When a long term dehydration is used such as in a tunnel kiln or in an oven, temperatures in the region of 25° to 50°C are preferred. Of course, other drying procedures can be used in appropriate instances to produce a useful product.

An alkali metal carboxyalkoxy succinate is carboxymethoxy succinic acid, trisodium salt, for which the reactant zinc or alkali metal salts are salts of maleic acid and glycolic acid. Fumaric acid enters the picture through isomerization of maleic acid.

Salts of other hydroxy acids may be used with maleic acid to produce other alkali metal carboxyalkoxy succinates or intermediate zinc or alkali metal carboxyalkoxy succinate intermediates. In general, saturated unsubstituted monobasic hydroxy organic acids having from two to seven carbon atoms per molecule are preferred. Other suitable acids include hydroxy polybasic acids, particularly similar saturated unsubstituted dibasic hydroxy organic acids having up to about seven carbon atoms per molecule, and the like.

Exemplary starting acids and the calcium salts produced therefrom are:

β-hydroxy propionic acid
α-[carboxy-ethoxy]succinic acid Ca salt
α-hydroxy propionic acid
α-[-1'-methyl-1'-carboxymethoxy]succinic acid Ca salt
α-hydroxy butyric acid
α-[1'-ethyl-carboxymethoxy]succinic acid Ca salt
β-hydroxy butyric acid
α-[1-methyl-2-carboxyethoxy]succinic acid Ca salt
γ-hydroxybutyric acid
α-[3-carboxypropoxy]succinic acid Ca salt
α-hydroxyhexanoic acid
α-[1-carboxy-1-butyl-methoxy]succinic acid Ca salt
5-hydroxy pentanoic acid
α-[5-carboxypentoxy]succinic acid Ca salt
4-hydroxyhexanoic acid
α-[1-methyl-4-carboxybutoxy]succinic acid Ca salt
2-hydroxy heptanoic acid
α-[1-butyl-2-carboxyethoxy]succinic acid Ca salt
2-hydroxy-3-methyl pentanoic acid
α-[1-isopropyl-2-carboxyethoxy]succinic acid Ca salt
3-hydroxy-4-methyl hexanoic acid
α-[1-isopropyl-3-carboxy-prop-1-oxy]succinic acid Ca salt
α-[1-isopropyl-3-carboxy-prop-1-oxy]succinic acid Ca salt The following example indicates a preferred embodiment of the present invention.

EXAMPLE 14.0 Grams of carboxymethoxy succinic acid calcium salt (CMOS)$Ca_{1.5}$ was placed in a beaker equipped with a stirrer.

The salt analyzed as follows:

|  | Wt. Percent | Mol Percent (Anhydrous) |
|---|---|---|
| CMOS $Ca_{1.5}$ | 43.4 | 87.0 |
| Glycolate $Ca_{0.5}$ | 1.2 | 6.2 |
| Maleate $Ca_{1.0}$ | 1.0 | 3.0 |
| Fumarate $Ca_{1.0}$ | 1.2 | 3.8 |
| Water | 53.2 | — |
|  | 100.0 | 100.0 |

The CMOS $Ca_{1.5}$ was produced by reacting 490 grams (4.79 mols) of maleic anhydride, 2,400 cc of water, 383.3 grams of glycolic acid (5.04 mols), and 576 grams of calcium hydroxide (94.5 percent purity — 7.37 mols) at 85°C in an open beaker for about 1 hour. The composition at this point was analyzed by NMR (nuclear magnetic resonance) and was found to contain (anhydrous mol percent basis) 78 percent carboxymethoxy succinic acid calcium salt, 5.7 percent calcium malonate, 2.4 percent calcium fumarate and 13.9 percent calcium glycolate.

The crude composition thus obtained was filtered through a coarse frit and washed with two portions of 1,000 cc each of water at room temperature. The precipitate recovered contained (anhydrous mol percent basis non-normalized) 86.9 percent carboxymethoxy succinic acid calcium salt, 6.2 percent calcium glycolate, 3 percent calcium malonate, 3.8 percent calcium fumarate. The two cold water washings reduced the percentage content of the impurity salts of maleic, fumaric and glycolic acids; however, the amount of the impurities of such acids present was still excessive.

To this was added 20 ml of water and the resulting system was heated to 90° to 100°C, and the system agitated for about 15 minutes. The resulting slurry was filtered and the precipitate on the filter paper was washed with 25 cc of water which had been heated to 60°C. The precipitate was then added to 25 cc of water containing 3.1 grams $Na_2CO_3 \cdot H_2O$. This was 0.0248 mols of sodium carbonate and represented 68.0 percent of the stoichiometric amount required to replace with sodium all of the calcium present in the carboxymethoxy succinic acid calcium salt content of the starting material. This formed a solution of carboxymethoxy succinic acid sodium salt containing a precipitate.

The resulting mixture was heated to 70° to 80°C and agitated for about 15 minutes at that temperature and then filtered. The solution analyzed by NMR and reported to an anhydrous basis contained the following materials:

|  | Mol Percent | Wt. Percent as $CMOSNa_3$ |
|---|---|---|
| CMOS $Na_3$ | 96.0 | 98.0 |
| Maleate $Na_2$ | 2.0 | 1.2 |
| Glycolate Na | 2.0 | 0.8 |
|  | 100.0 | 100.0 |

The filtrate was air dried at 60°C in a beaker in an oven. The solid residue was transferred to a mortar and pestle and ground to produce a powder. Then the ground material was spread in a thin layer and dried in an oven at 60°C for 1 hour. 4.2 Grams of product was thus obtained. After one week standing in a thin layer in an open dish in the laboratory, the material remained free-flowing without any visible pick-up or loss of moisture.

I claim:

1. A process for producing a high purtiy alkali metal carboxyalkoxy succinate from a zinc or alkaline earth metal carboxyalkoxy succinate contaminated with zinc or alkaline earth metal salt of at least one of maleic acid, fumaric acid and hydroxy organic acid which comprises, selectively reacting the zinc or alkaline earth metal carboxyalkoxy succinate with a stoichiometric deficiency ratio of alkali metal carbonate for complete reaction of all zinc or alkaline earth metal salt present to form a solution of alkali metal carboxyalkoxy succinate containing a carbonate of the zinc or alkaline earth metal, and recovering the soluble alkali metal carboxyalkoxy succinate solution from the zinc or alkaline earth metal salt residue of maleic acid, fumaric acid or hydroxy organic acid remaining after the selective reaction of the carboxyalkoxy succinate.

2. A process as in claim 1 wherein the zinc or alkaline earth metal carboxyalkoxy succinate is produced by a reaction of zinc or alkaline earth metal salts of glycolic acid and maleic acid at a pH of at least about 8 as measured at 25°C.

3. A process as in claim 1 wherein the zinc or alkaline earth metal carboxyalkoxy succinate is produced by a reaction of calcium glycolate and calcium maleate at a pH of at least about 8 as measured at 25°C to form carboxymethoxy succinic acid, calcium salt, contaminated with calcium glycolate, calcium maleate and calcium fumarate.

4. A process of claim 1 wherein the alkali metal carbonate is sodium carbonate and the amount used is from about 25 to about 100 percent of the stoichiometric amount required to react selectively to convert the zinc or alkaline earth metal carboxyalkoxy succinate present to alkali metal carboxyalkoxy succinate.

5. A process in claim 1 wherein the alkali metal carbonate is sodium carbonate and the amount is from about 50 to about 90 percent of the stoichiometric amount required to react selectively to convert the zinc or alkaline earth metal carboxyalkoxy succinate present to alkali metal carboxyalkoxy succinate.

6. A process in claim 1 wherein the alkali metal carbonate is sodium carbonate and the amount is from about 60 to about 80 percent of the stoichiometric amount required to react selectively to convert the zinc or alkaline earth metal carboxyalkoxy succinate present to alkali metal carboxyalkoxy succinate.

7. A process as in claim 1 wherein the alkali metal carbonate is sodium carbonate and it is reacted with carboxymethoxy succinic acid, calcium salt to produce carboxymethoxy succinic acid, sodium salt at a temperature of from about 70° to about 100° precipitating calcium carbonate.

8. A process as in claim 1 wherein the purified alkali metal carboxyalkoxy succinate solution is dried at a temperature of from about 25° to about 150°C.

9. A process as in claim 1 wherein the water is evaporated from the alkali metal carboxymethoxy succinate at a temperature of from about 25° to about 50°C.

10. A process as in claim 1 wherein the alkaline earth metal carboxyalkoxy succinate is washed with water at a temperature of from about 50° to about 100°C prior to the selective reaction.

* * * * *